US008885750B2

(12) United States Patent
Xiao et al.

(10) Patent No.: US 8,885,750 B2
(45) Date of Patent: Nov. 11, 2014

(54) METHOD AND SYSTEM FOR TRANSMITTING DATA USING COLLABORATIVE MULTIPLE INPUT MULTIPLE OUTPUT BEAMFORMING

(75) Inventors: Huahua Xiao, Shenzhen (CN); Dengkui Zhu, Shenzhen (CN); Zhaohua Lu, Shenzhen (CN); Kun Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/522,456

(22) PCT Filed: Jan. 27, 2010

(86) PCT No.: PCT/CN2010/070380
§ 371 (c)(1),
(2), (4) Date: Jul. 16, 2012

(87) PCT Pub. No.: WO2011/091589
PCT Pub. Date: Aug. 4, 2011

(65) Prior Publication Data
US 2012/0281781 A1 Nov. 8, 2012

(51) Int. Cl.
H04B 7/02 (2006.01)
H04B 7/06 (2006.01)
H04B 7/10 (2006.01)
H04L 1/00 (2006.01)
H04B 7/04 (2006.01)

(52) U.S. Cl.
CPC H04B 7/024 (2013.01); *H04B 7/10* (2013.01); *H04L 1/0001* (2013.01); H04B 7/0697 (2013.01); H04B 7/0632 (2013.01); H04B 7/0636 (2013.01); *H04B 7/0465* (2013.01); *H04L 1/0026* (2013.01); H04B 7/0617 (2013.01); H04B 7/0689 (2013.01); H04B 7/0434 (2013.01)
USPC ............ 375/267; 375/296; 375/295

(58) Field of Classification Search
CPC ...................................................... H04B 7/024
USPC .......................................... 375/267, 296, 295
See application file for complete search history.

(56) References Cited

U.S. PATENT DOCUMENTS

2006/0285504 A1* 12/2006 Dong et al. ................... 370/254
2007/0147536 A1* 6/2007 Melzer et al. ................. 375/267

(Continued)

FOREIGN PATENT DOCUMENTS

CN 1969463 A 5/2007
CN 101212281 A 7/2008

(Continued)

OTHER PUBLICATIONS

International Search Report; Nov. 4, 2010; issued in International Patent Application No. PCT/CN2010/070380.

*Primary Examiner* — Michael Neff
(74) *Attorney, Agent, or Firm* — Henry B. Ward, III; Moore & Van Allen PLLC

(57) ABSTRACT

The present invention discloses a method and a system for transmitting data using the collaborative multiple input multiple output (MIMO) beamforming. The method comprises: selecting an MIMO mode according to channel quality information (CQI) (S502); performing the MIMO encoding on a data stream according to the selected MIMO mode, and distributing the encoded data stream to a plurality of transmitting ends which are mutual collaborative (S504); and transmitting, by the plurality of transmitting ends, the encoded data stream (S506). The present invention solves the problem in the relevant art of reducing the system performance and the flexibility, which is caused by adopting the fixed MIMO mode when the system carries out the encoding and the transmission, which is capable of improving the system performance.

16 Claims, 5 Drawing Sheets

(56) References Cited

U.S. PATENT DOCUMENTS

| | | |
|---|---|---|
| 2008/0051129 A1 | 2/2008 | Abe et al. |
| 2008/0267056 A1* | 10/2008 | Aryanfar et al. ............. 370/203 |
| 2009/0015472 A1* | 1/2009 | Lozano ........................ 342/367 |
| 2009/0268684 A1* | 10/2009 | Lott et al. ..................... 370/329 |
| 2009/0291699 A1* | 11/2009 | Heath et al. .................. 455/501 |

FOREIGN PATENT DOCUMENTS

| | | |
|---|---|---|
| CN | 101557249 A | 10/2009 |
| CN | 101729119 A | 6/2010 |

* cited by examiner

METHOD AND SYSTEM FOR TRANSMITTING DATA USING COLLABORATIVE MULTIPLE INPUT MULTIPLE OUTPUT BEAMFORMING

FIELD OF THE INVENTION

The present invention relates to the wireless communication field, and in particular to a method and a system for transmitting data using the collaborative multiple input multiple output (MIMO) beamforming.

BACKGROUND OF THE INVENTION

The Beam Forming (BF) is based on the principle of adaptive antenna and each antenna unit is weighted respectively utilizing the antenna array according to the advanced signal processing algorithm, so as to make the array align in real time the useful signal direction and form the interference nulling in the interference direction to suppress the interference signal. FIG. 1 is a schematic diagram illustrating a beamforming system. The use of the beamforming technology can improve the signal to noise ratio, and improve the system performance and extend the coverage of the system.

The single transmitting end MIMO is a communication system in which a plurality of antennas are disposed respectively on the transmitting end and the receiving end. As shown in FIG. 2, the encoding modes thereof are mainly divided into two types: the space diversity and the space multiplexing. When the transmitting end or the receiving end has a plurality of antennas and data sets sent by the each transmitting antenna are the same, the receiving end merges the signals acquired from a plurality of branches and thus the reliability of the link is improved, and this type of MIMO technology is referred to as the space diversity. When both the transmitting end and the receiving end simultaneously have a plurality of antennas, because the MIMO channel is equivalent to a plurality of parallel channels, a plurality of data streams can be simultaneously transmitted in parallel and thus the transmission rate of the data is improved, and this is the space multiplexing.

The collaborative MIMO is an extension of the conventional single transmitting end MIMO technology. In the collaborative MIMO technology, a plurality of transmitting ends provide the services for a plurality of receiving ends on the same time-frequency resources by the collaboration, so as to achieve the purpose of reducing the interference between cells, improving the system capacity, improving the coverage of the cell boundaries and improving data rate of the receiving end, and the technology is very effective for improving the performance of the cell boundaries of the receiving end. The collaborative MIMO beamforming refers to a technology that each transmitting end adopts the beamforming in the collaborative MIMO system. As shown in FIG. 3, two transmitting ends provide service for the user located at the cell edge on the same time-frequency resources by way of the collaboration, so as to achieve the purpose of reducing the interference between the cells, thereby significantly improving data rate of the receiving end. As shown in FIG. 4, in order to implement the collaborative MIMO, the mutual collaborative transmitting ends need to communicate with each other, and functions of the resource scheduling and the MIMO encoding for data stream etc. are performed by a general controller.

In the cellular mobile communication system, the collaborative MIMO technology and the other single transmitting end MIMO technologies would co-exist, and it is also possible to require the mode switch between the different MIMO modes. And in the relevant art, the system is still configured as the fixed MIMO mode and subsequently still adopts the fixed MIMO mode to carry out the encoding and the transmission for the data steam, which would affect the flexibility of the collaborative MIMO system and would simultaneously cause the problem of decline of the system performance.

SUMMARY OF THE INVENTION

One aspect of the present invention is to provide a method and a system for transmitting data using the collaborative multiple input multiple output beamforming, so as to solve at least one of the above problems.

A method for transmitting data using the collaborative multiple input multiple output beamforming is provided according to one aspect of the present invention, and the method comprises: selecting an MIMO mode according to channel quality information (CQI); performing the MIMO encoding on a data stream according to the selected MIMO mode, and distributing the encoded data stream to a plurality of transmitting ends which are mutual collaborative; and transmitting, by the plurality of transmitting ends, the encoded data stream.

A system for transmitting data using collaborative MIMO beamforming is provided according to another aspect of the present invention, and the system comprises: a plurality of transmitting ends, a receiving end and a general controller, wherein the general controller comprises: an MIMO mode selecting module for selecting an MIMO mode according to CQI; an MIMO encoding module for performing the MIMO encoding on a data stream according to the selected MIMO mode; and a transmit module for distributing the encoded data stream to the plurality of transmitting ends which are mutual collaborative; the plurality of transmitting ends are configured to transmit the encoded data stream to the receiving end; and the receiving end is configured to receive the encoded data stream.

By virtue of the present invention, the problem in the relevant art of reducing the system performance and the flexibility, which is caused by the system adopting the fixed MIMO mode to carries out the encoding and the transmission, is solved by selecting an MIMO mode according to channel quality information, further performing the encoding on a data stream according to the selected MIMO mode and distributing the encoded data stream to a plurality of collaborative transmitting ends, and subsequently using the transmitting ends to transmit the encoded data stream, which can improve the system performance.

BRIEF DESCRIPTION OF THE DRAWINGS

The drawings illustrated herein provide a further understanding of the present invention and form a part of the present application. The exemplary embodiments and the description thereof are used to explain the present invention without unduly limiting the scope of the present invention. In the drawings.

DETAILED DESCRIPTION OF EMBODIMENTS

The present invention is described hereinafter in detail with reference to the accompanying drawings and in combination with the embodiments. It has to be noted that the embodiments and the features of the embodiments in the present application can be combined with each other under the circumstances that there is no conflict.

Figure 1:
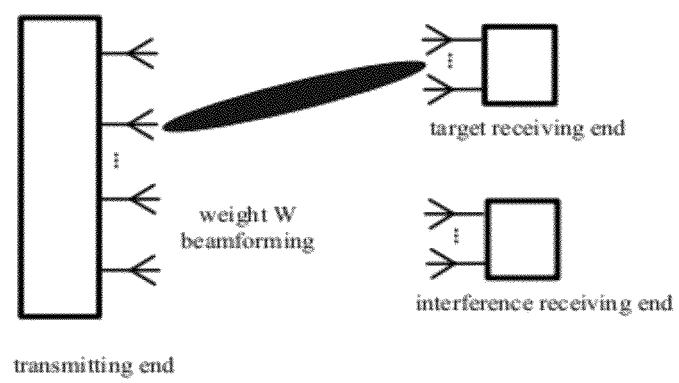
FIG. 1 is a schematic diagram of a BF system based on the linear antenna array according to the relevant art.
Figure 2:
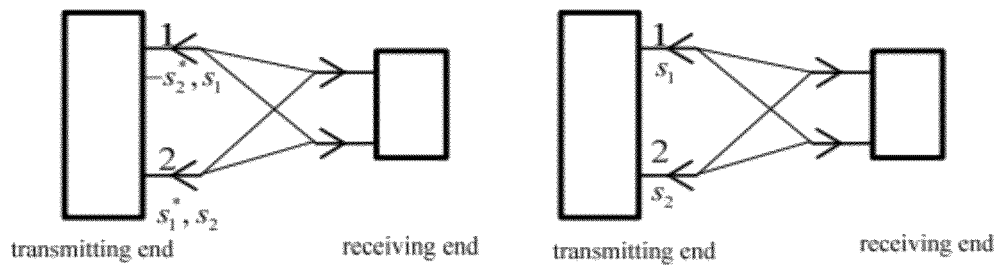
FIG. 2 is a schematic diagram of a single transmitting end MIMO system using the encoding modes of the space diversity and the space multiplexing according to the relevant art.
Figure 3:
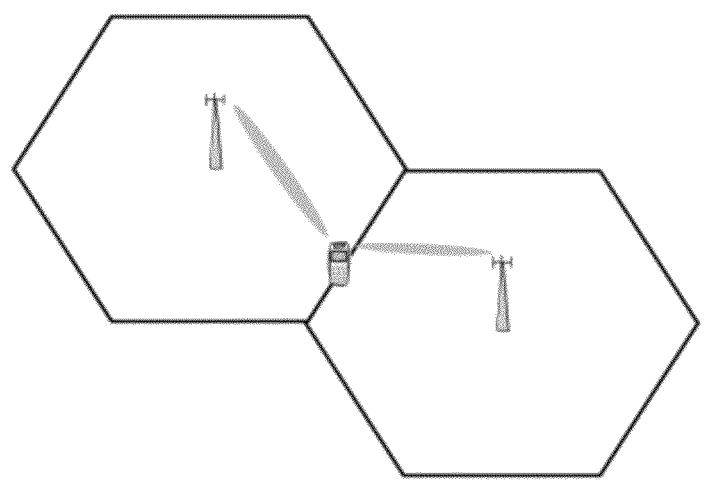
FIG. 3 is a schematic diagram of serving the edge receiving end by the collaborative MIMO beamforming according to the relevant art.
Figure 4:
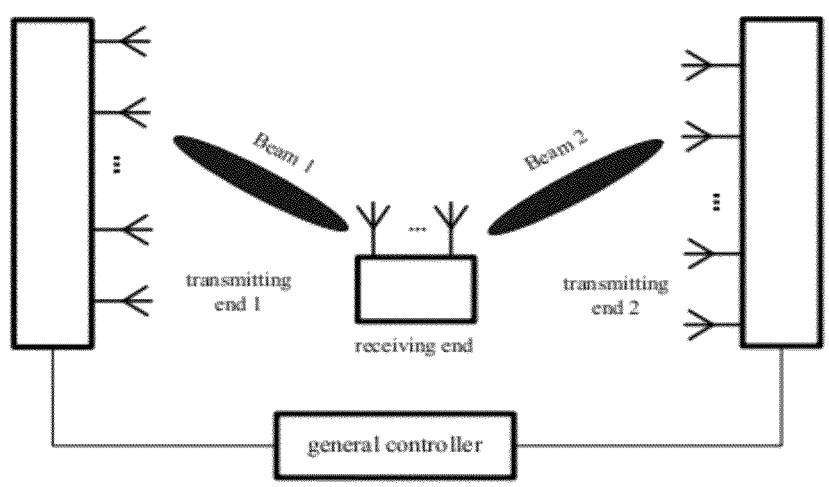
FIG. 4 is a schematic diagram of a receiving end, transmitting ends and a controller in the collaborative MIMO beamforming according to the relevant art.
Figure 5:
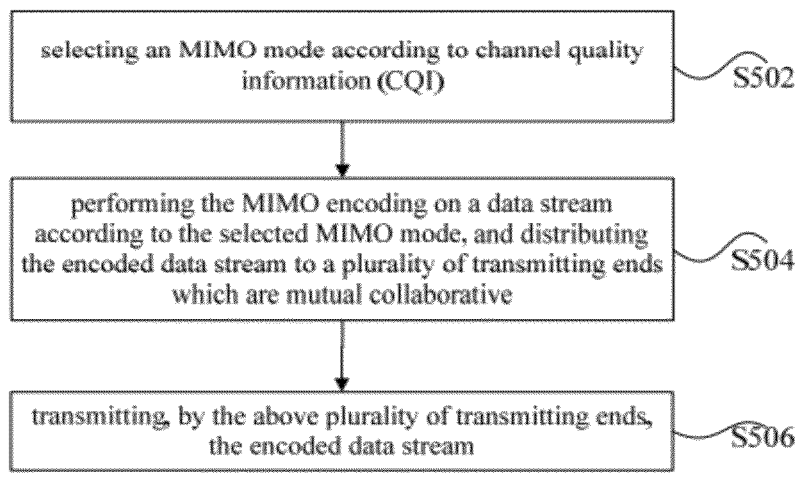
FIG. 5 is a flowchart of a method for transmitting data using the collaborative multiple input multiple output (MIMO) beamforming according to an embodiment of the present invention.

The embodiment of the present invention provides a method for transmitting data using the collaborative multiple input multiple output (MIMO) beamforming, and the method can be applied to the wireless communication system comprising a receiving end and a plurality of mutual collaborative transmitting ends. FIG. 5 is a flow chart of a method for transmitting data using the collaborative multiple input multiple output (MIMO) beamforming according to an embodiment of the present invention, and as shown in FIG. 5, the method comprises:

step S502: selecting an MIMO mode according to channel quality information (CQI);

step S504: performing the MIMO encoding on a data stream according to the selected MIMO mode, and distributing the encoded data stream to a plurality of transmitting ends which are mutual collaborative; and step S506: transmitting, by the above plurality of transmitting ends, the encoded data stream.

In the relevant art, the MIMO encoding by adopting the fixed MIMO mode cannot be suitable flexibly for the situation of the mutual switching between a plurality of MIMO modes, thereby resulting in the decline of the system performance. Different from the relevant art, the method provided by the embodiment of the present invention at first selects the MIMO mode according to the channel quality information and then perform the MIMO encoding on the data stream according to the selected MIMO mode, and afterwards the data stream is transmitted by the plurality of transmitting ends, and by way of the method, it can be suitable flexibly for the switching among the plurality of MIMO modes, thereby improving the system performance.

The above transmitting ends refer to devices used for transmitting data or information, such as a macro base station, a micro base station and so on. The receiving end refers to devices used for receiving data or information, such as a terminal, a mobile station, a handheld device, a data card and so on.

The above MIMO encoding particularly refers to a process of forming more than one data streams after carrying out the transform processing for one or more of data stream(s), and the MIMO encoding in the wireless communication system can comprise the ways of the space diversity and the space multiplexing, wherein the space diversity refers to: transforming each input data stream into multiple copies and/or the conjugations of the copies and/or the negative conjugations of the copies; and the space multiplexing refers to: outputting directly one or more of input data stream(s).

Preferably, step S502 comprises: selecting one MIMO mode from a plurality of predetermined MIMO modes according to the CQI, wherein the plurality of predetermined MIMO modes comprise: the space multiplexing mode of the collaborative MIMO beamforming, the space diversity mode of the collaborative MIMO beamforming and the single transmitting end MIMO mode. The implementation of the process can comprise but is not limited to two ways as follows:

Way One: a Distance-Based Method

Step 1: calculating $D=f(CI_1, \ldots, CI_i, \ldots, CI_N)$, where $CI_i$ is the CQI from a receiving end to the i-th transmitting end, $i=1, \ldots, N$ is the number of the plurality of mutual collaborative transmitting ends, and $f(CI_1, \ldots, CI_i, \ldots, CI_N)$ is the quantization operation for the proximity of values $CI_1, \ldots, CI_i, \ldots, CI_N$. Preferably, $f(CI_1, \ldots, CI_i, \ldots, CI_N)=\Sigma_{1\leq k<j\leq N}|CI_k-CI_j|^p$, where p>0, and it has to be noted that $f(CI_1, \ldots, CI_i, \ldots, CI_N)$ comprises all operations that can achieve the quantization for the proximity of $CI_1, \ldots, CI_i, \ldots, CI_N$ and is not limited to $f(CI_1, \ldots, CI_i, \ldots, CI_N)=\Sigma_{1\leq k<j\leq N}|CI_k-CI_j|^p$.

Step 2: judging whether D is less than a first threshold value $d_1$, if yes, selecting the space multiplexing mode of the collaborative MIMO beamforming from the plurality of predetermined MIMO modes; otherwise, judging whether D is less than a second threshold value $d_2$, if yes, selecting the space diversity mode of the collaborative MIMO beamforming from the plurality of predetermined MIMO modes; and if $D\geq d_2$, selecting the single transmitting end MIMO mode from the plurality of predetermined MIMO modes, where $0<d_1<d_2$.

Preferably, in the step 2, the step of selecting the single transmitting end MIMO mode from the plurality of predetermined MIMO modes comprises: selecting the single transmitting end MIMO mode in which the transmitting end corresponding to the maximum value in $CI_1, \ldots, CI_i, \ldots, CI_N$ sends the data to the receiving end, i.e. selecting that transmitting end corresponding to the maximum value in $CI_i$, $i=1, \ldots, N$ to transmit independently the data to the receiving end.

Way Two

Step 1: calculating $R=f(CI_1, \ldots, CI_i, \ldots, CI_N)$, where $CI_i$ is the CQI from a receiving end to the $i^{th}$ end, $i=1, \ldots, N$, and N is the number of the plurality of mutual collaborative transmitting ends. $f(CI_1, \ldots, CI_i, \ldots, CI_N)$ is the quantization operation for the ratio of values $CI_1, \ldots, CI_i, \ldots, CI_N$. Preferably, $$f(CI_1, \ldots, CI_i, \ldots, CI_N) = \frac{\min(CI_1, \ldots, CI_i, \ldots, CI_N)}{\max(CI_1, \ldots, CI_i, \ldots, CI_N)},$$

where $\min(CI_1, \ldots, CI_i, \ldots, CI_N)$ represents calculating the minimum value in $CI_1, \ldots, CI_i, \ldots, CI_N$, and $\max(CI_1, \ldots, CI_i, \ldots, CI_N)$ represents calculating the maximum value in $CI_1, \ldots, CI_i, \ldots, CI_N$. It has to be noted that $f(CI_1, \ldots, CI_i, \ldots, CI_N)$ comprises all operations that can achieve the quantization for the ratio of $CI_1, \ldots, CI_i, \ldots, CI_N$ and is not limited to $$f(CI_1, \ldots, CI_i, \ldots, CI_N) = \frac{\min(CI_1, \ldots, CI_i, \ldots, CI_N)}{\max(CI_1, \ldots, CI_i, \ldots, CI_N)}.$$

For example, it can also be $$f(CI_1, \ldots, CI_i, \ldots, CI_N) = \sum_{1 \le k < j \le N} \beta_{kj} \min\left(\frac{CI_k}{CI_j}, \frac{CI_j}{CI_k}\right)$$

or $$f(CI_1, \ldots, CI_i, \ldots, CI_N) = \sum_{1 \le k < j \le N} \beta_{kj} \frac{\min(CI_k, CI_j)}{\max(CI_k, CI_j)},$$

where $\beta_{kj}$, $1 \le k < j \le N$ is a constant. In addition, the objects, the ratio of which is calculated, can also be weighted average values (comprising the situation that the weight is 1, i.e., the situation of the arithmetic mean) of partial values in $CI_1, \ldots, CI_i, \ldots, CI_N$, such as capable of being a ratio between the average value of $CI_1$, $CI_2$ and $CI_5$ and the average value of $CI_3$ and $CI_4$.

Step 2: judging whether R is greater than a second threshold value $r_2$, if yes, selecting the space multiplexing mode of the collaborative MIMO beamforming from the plurality of predetermined MIMO modes; otherwise, judging whether R is greater than or equal to a first threshold value $r_1$, if yes, selecting the space diversity mode of the collaborative MIMO beamforming from the plurality of predetermined MIMO modes; and if $R < r_1$, selecting the single transmitting end MIMO mode from the plurality of predetermined MIMO modes, where $0 < r_1 < r_2$.

Preferably, in the step 2, the step of selecting the single transmitting end MIMO mode from the plurality of predetermined MIMO modes comprises: selecting the single transmitting end MIMO mode in which the transmitting end corresponding to the maximum value in $CI_1, \ldots, CI_i, \ldots, CI_N$ sends the data to the receiving end, i.e. selecting that transmitting end corresponding to the maximum value in $CL_i$, $i=1, \ldots, N$ to transmit independently the data to the receiving end.

In both the Way One and the Way Two, $CI_1, \ldots, CI_i, \ldots, CI_N$ comprise at least one of the following: a received power, and a predetermined signal to noise ratio, wherein the predetermined signal to noise ratio comprises at least one of the following: a signal to noise ratio (SNR), a signal to interference and noise ratio (SINR) and a carrier to interference plus noise ratio (CINR). Hereinafter, various types of signal to noise ratio are all represented by the CINR, including the SNR and the SINR hereinafter.

Preferably, step S506 comprises:
step S5062, determining a weight of the beamforming of each transmitting end in the plurality of transmitting ends; and
step S5064, weighting, by the each transmitting end using the weight, the encoded data stream and transmitting it.

In these steps, step S5062 comprises:
step S5062-1, acquiring a statistical channel correlation matrix of the each transmitting end according to channel coefficient information; and
step S5062-2, determining the weight of the beamforming of the each transmitting end according to the statistical channel correlation matrix.

Step S5062-1 particularly comprises:
1. an initialization step: initializing the statistical channel correlation matrix of the each transmitting end, selecting symbol indexes used for the statistical channel correlation matrixes in a current frame, and letting a current symbol index be the first index in the symbol indexes used for the statistical channel correlation matrixes, wherein the statistical channel correlation matrix of the $i^{th}$ transmitting end is $R_{stat,i}$, where i is a positive integer;
2. a calculation step: calculating the channel correlation matrix $$R_i = \sum_{k=1}^{N} \alpha_{i,k} (H^i(k))^H * H^i(k)$$

on a predetermined carrier set on the symbol corresponding to the current symbol index from the receiving end to the $i^{th}$ transmitting end, where N is the number of carriers contained in the predetermined carrier set, $H^i(k)$ is a channel coefficient matrix of the $k^{th}$ subcarrier in the predetermined carrier set which is from a transmitting antenna of the $i^{th}$ transmitting end to an antenna of the receiving end, the superscript H represents a conjugate transposition operation for the matrix, and $\alpha_{i,k}$ is a proportional coefficient occupied by the channel matrix $H^i(k)$ on the $k^{th}$ carrier on the $i^{th}$ transmitting end;

In this embodiment, $H^i(k)$ is acquired by at least one of the following ways: 1) the $i^{th}$ transmitting end measures a channel coefficient matrix of an uplink channel corresponding to the receiving end, and acquires the $H^i(k)$ which has Rx rows and Txi columns according to the measured channel coefficient matrix, where Rx is the number of transmitting antennas of the receiving end, and Txi is the number of receiving antennas of the $i^{th}$ transmitting end; 2) the receiving end feeds back the channel coefficient matrix corresponding to the receiving end to the $i^{th}$ transmitting end through an uplink feedback channel, and acquire the $H^i(k)$ which has Rx rows and Txi columns according to the fed back channel coefficient matrix, where Rx is the number of receiving antennas of the receiving end, and Txi is the number of transmitting antennas of the $i^{th}$ transmitting end.

The above uplink channel comprises one of the following: a data channel for the receiving end transmitting the uplink service, the uplink feedback channel for the receiving end feeding back information to the $i^{th}$ transmitting end, and a channel corresponding to a Sounding signal or a pilot signal sent by the receiving end to the $i^{th}$ transmitting end.

3. an update step: updating the statistical channel correlation matrix of the $i^{th}$ transmitting end $R_{stat,i} = \rho_i R_{stat,i} + (1-\rho_i) R_i$, and updating the value of the current symbol index with the next symbol index of the current symbol index, where $\rho_i$ is a constant and $0 \le \rho_i \le 1$; and 4. a control step: repeating the calculation step 2 and the update step 3 until the symbol corresponding to the current symbol index being the last index in the symbol indexes used for the statistical channel correlation matrixes.

The implementation of step S5062-2 comprises one of the following ways:

Way One: the Fixed Weight Method $$W_{opt} = \max_{W_j, j=1,\ldots,N} \det(W_j^H R_{stat,i} W_j)$$

is set as the weight of the beamforming of the $i^{th}$ end, where $W_j$, j=1, 2, ..., N is a preset plural column vector, and det(x) represents calculating the determinant value of the matrix x.

Way Two: the Eigenvector Weight Method

The statistical channel correlation matrix $R_{stat,i}$, undergoes the eigenvalue decomposition, and the eigenvector $W_i$ corresponding to the maximum eigenvalue is set as the beamforming weight of the $i^{th}$ end, where $W_i$ is a Txi×1 vector, and Txi is the number of transmitting antennas of the $i^{th}$ end.

Way Three: the Constant Modulus Eigenvector Method

The statistical channel correlation matrix $R_{stat,i}$, undergoes the eigenvalue decomposition, and $W_i = f(\tilde{W}_i)$ is set as the beamforming weight of the $i^{th}$ transmitting end, where $\tilde{W}_i$ is a eigenvector corresponding to the maximum eigenvalue obtained by carrying out the eigenvalue decomposition for $R_{stat,i}$, $W_i$ and $\tilde{W}_i$ are Txi×1 vectors, Txi is the number of transmitting antennas of the i-th transmitting end, $f(\tilde{W}_i)$ represents the constant modulus operation for the vector $\tilde{W}_i$, and the constant modulus operation namely is an operation which makes the modulus of each element in the vector $\tilde{W}_i$ be equal.

It is possible that the process of determining the beamforming weight of each of the plurality of transmitting ends is not limited to the method for updating the weight in the above step S5062-1 and step S5062-2, and the previously reserved weight (the initial weight preset by the system or the weight acquired according to the channel coefficient information in the last time) can also be determined as the current weight. Thus based on the above reason, before step S5062-1, it can be judged whether there is a need to update the weight, and if yes, then the subsequent processing is continued, otherwise, the each transmitting end weights the MIMO encoded data stream to be transmitted by adopting the weight preconfigured by the system, or adopting the weight determined in the last time, and transmits it.

The process of implementing the embodiment of the present invention will be described in detail hereinafter in conjunction with the examples.

Figure 6:
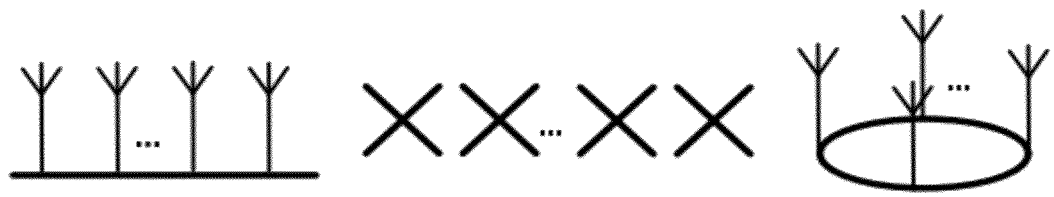
FIG. 6 is a schematic diagram of types of the antenna of the transmitting ends according to an embodiment of the present invention.

FIG. 6 is a schematic diagram of types of antennas configuration according to an embodiment of the present invention, in which, FIG. 6(a) is a schematic diagram of the linear array antennas, FIG. 6(b) is a schematic diagram of the dual-polarized antennas, and FIG. 6(c) is schematic diagram of the cylindrical antennas. The embodiment of the antenna configuration applied in the embodiments of the present invention will be described in conjunction with FIG. 6 and by means of Example 1 to Example 3 hereinafter.

Example 1

The example describes the embodiment of the linear array antennas in the antenna configuration part in conjunction with FIG. 6(a). As shown in FIG. 6(a), a plurality of antennas are mounted on the transmitting end or the receiving end, and individual antennas are located on one beeline in one plane. Each antenna can be an omnidirectional antenna which transmits the electromagnetic wave to all directions, or be a directional antenna which transmits the electromagnetic wave to a certain angle range, or be a single-polarization antenna which is polarized in a certain direction.

Example 2

The example describes the embodiment of the dual-polarized antennas in the antenna configuration part in conjunction with FIG. 6(b). As shown in FIG. 6(b), multiple pairs of antennas are mounted on the transmitting end or the receiving end, and the individual pairs of antennas are located on one beeline in the same plane. Each pair of antennas is a pair of dual-polarized antennas which are polarized in a certain direction, for example, one polarized antenna in this pair of dual-polarized antennas has the +45° polarization, and the other has the −45° polarization.

Example 3

The example describes the embodiment of the cylindrical antennas in the antenna configuration part in conjunction with FIG. 6(c). As shown in FIG. 6(c), a plurality of antennas are mounted on the transmitting end or the receiving end, and the individual antennas are located on the edge of an ellipse. Each antenna can be an omnidirectional antenna which transmits the electromagnetic wave to all directions, or be a directional antenna which transmits the electromagnetic wave to a certain angle range, or be a single-polarization antenna which is polarized in a certain direction.

Example 4

The example describes the embodiment of obtaining the channel coefficient matrix utilizing the channel reciprocity.

Tx1 antennas, Tx2 antennas and Rx antennas are mounted respectively on a transmitting end 1, a transmitting end 2 and a receiving end, and the antenna configuration type can be the linear array antennas or the dual-polarized antennas or the cylindrical antennas in FIG. 6. The receiving end transmits a data stream using part or all of mounted antennas, and the data stream can be a pilot, Sounding sequence, the service data or information fed back by the receiving end to the transmitting end. Here, the number of antennas for the receiving end transmitting the data stream is Rt, and Rt≤Rx. The transmitting end estimates an uplink channel corresponding to the first group of antennas, and the estimated channel coefficient is $h^1_{i,j}(t,k)$, which represents the channel coefficient on the $k^{th}$ subcarrier at the t moment between the antenna j which is used for the receiving end transmitting the data and the antenna i of the transmitting end 1, where i=1, ..., Tx1, j=1, ..., Rt, t=1, ..., Ts, k=1, ..., N, and Ts, and N represent the number of symbols of resource blocks used for estimating the weight on the time domain and the number of subcarriers of the resource blocks on the frequency domain. The matrix form thereof is represented as:

$$H^1_{UL}(t,k) = \begin{pmatrix} h^1_{1,1}(t,k) & \cdots & h^1_{1,Rt}(t,k) \\ \vdots & \ddots & \vdots \\ h^1_{Tx1,1}(t,k) & \cdots & h^2_{Tx3,Rt}(t,k) \end{pmatrix}_{Tx1 \times Rt},$$

and similarly, the estimated channel coefficient matrix from the receiving end to the transmitting end 2 is represented as:

$$H_{UL}^2(t, k) = \begin{pmatrix} h_{1,1}^2(t, k) & \cdots & h_{1,Rt}^2(t, k) \\ \vdots & \ddots & \vdots \\ h_{Tx2,1}^2(t, k) & \cdots & h_{Tx2,Rt}^2(t, k) \end{pmatrix}_{Tx2 \times Rt},$$

in that way, by using the channel reciprocity, the downlink channel matrixes from the transmitting end 1 and the transmitting end 2 to the receiving end respectively are $(H^1{}_{UL}(t, k))^T$ and $(H^2{}_{UL}(t,k))^T$, where T represents the transposition of the matrix or the vector. The transmitting end 1 and the transmitting end 2 acquire the weight by using $(H^1{}_{UL}(t,k))^T$ and $(H^2{}_{UL}(t,k))^T$.

Example 5

The example describes the embodiment of obtaining the channel coefficient matrix by the downlink feedback.

Tx1 antennas, Tx2 antennas and Rx antennas are mounted respectively on a transmitting end 1, a transmitting end 2 and a receiving end, and the antenna configuration can be the linear array antennas or the dual-polarized antennas or the cylindrical antennas in FIG. 6. The channel coefficient $h^1{}_{i,j}(t, k)$ of a downlink link from the transmitting end 1 to the receiving end estimated by the receiving end, and in this example, represents the channel coefficient on the $k^{th}$ subcarrier at the t moment between the antenna j which is used for the receiving end to transmit the data and the $i^{th}$ antenna of the transmitting end 1, where j=1, . . . , Tx1; i=1, . . . , Rx; t=1, . . . , Ts; k=1, . . . , N, and Ts, and N represents the number of symbols of resource blocks used for estimating the weight in the time domain and the number of subcarriers of the resource blocks in the frequency domain. The matrix form thereof is represented as:

$$H_{DL}^1(t, k) = \begin{pmatrix} h_{1,1}^1(t, k) & \cdots & h_{1,Tx1}^1(t, k) \\ \vdots & \ddots & \vdots \\ h_{Rx1}^1(t, k) & \cdots & h_{Rx,Tx1}^1(t, k) \end{pmatrix}_{Rx \times Tx1},$$

and similarly, the estimated channel coefficient matrix from the antennas of the transmitting end 2 to the receiving end is represented as:

$$H_{DL}^2(t, k) = \begin{pmatrix} h_{1,3}^2(t, k) & \cdots & h_{1,Tx2}^2(t, k) \\ \vdots & \ddots & \vdots \\ h_{Rx3}^2(t, k) & \cdots & h_{Rx,Tx2}^2(t, k) \end{pmatrix}_{Rx \times Tx2},$$

the receiving end can acquire the weight of the beamforming, the index of the weight, or the statistical channel correlation matrix by using $H^1{}_{DL}(t,k)$ and $H^2{}_{DL}(t,k)$, and then feed back it to the corresponding transmitting end; or can feed back $H^1{}_{DL}(t,k)$ and $H^2{}_{DL}(t,k)$ or the quantitative $\tilde{H}_{DL}{}^1(t,k)$ and $\tilde{H}_{DL}{}^2(t,k)$ to the corresponding transmitting end, and then the transmitting end 1 and the transmitting end 2 acquire the beamforming weight by using $H^1{}_{DL}(t,k)$ and $H^2{}_{DL}(t,k)$ or the quantitative $\tilde{H}_{DL}{}^1(t,k)$ and $\tilde{H}_{DL}{}^2(t,k)$.

Example 6

Figure 10:
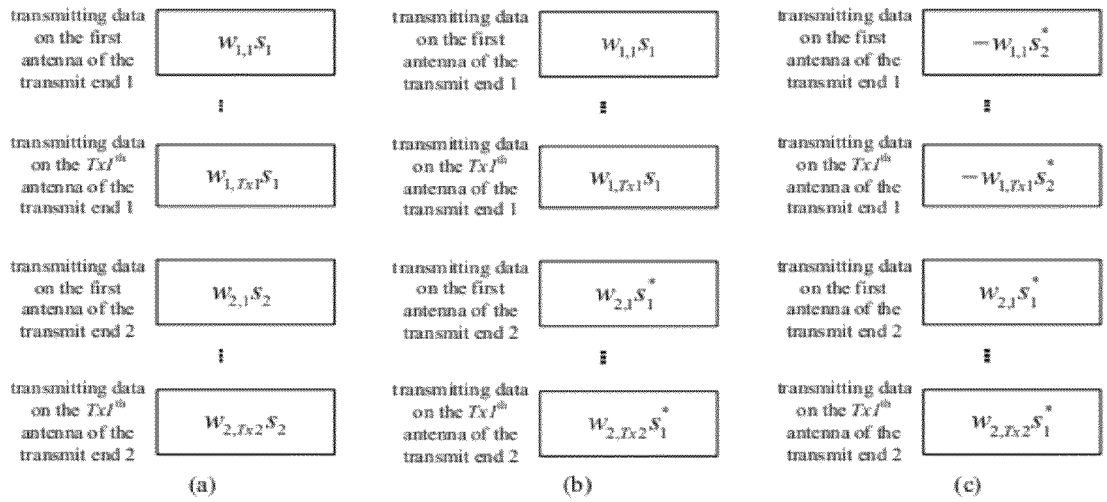
FIG. 10 is a schematic diagram that each physical antenna in two transmitting ends transmits data on one same time-frequency resource according to an embodiment of the present invention.

The example describes the embodiment of encoding by adopting the space diversity mode in conjunction with FIG. 10(*a*).

The number of transmitting physical antennas of the transmitting end 1 and the transmitting end 2 respectively are Tx1 and Tx2, and the antennas of each transmitting end are mimicked as a beam, and each beam is a virtual antenna. The transmitted data streams are $s_1$ and $s_2$, and the weight of the beamforming is:

$$W_1 = \begin{pmatrix} w_{1,1} \\ \vdots \\ w_{1,Tx1} \end{pmatrix}, W_2 = \begin{pmatrix} w_{2,1} \\ \vdots \\ w_{2,Tx2} \end{pmatrix}$$

When adopting the space diversity, the virtual antenna 1 transmits the data streams $s_1$ and $-s^*{}_2$ at two adjacent moments (or two subcarriers) respectively, and the virtual antenna 2 transmits the data streams $s_2$ and $s^*{}_1$ at two adjacent moments (or subcarriers) respectively. That is, at a first moment (or a first subcarrier), the situation of mapping to the physical antennas is shown in FIG. 10(*a*), in which the transmitting end 1 transmits the data $w_{1,i}s_1$ on the $i^{th}$ antenna and the transmitting end 2 transmits the data $w_{2,j}s_2$ on the $j^{th}$ antenna, and at a second moment (or a second subcarrier), the situation of mapping to the physical antennas is shown in FIG. 10(*c*), in which the transmitting end 1 transmits the data $-w_{1,i}s^*{}_2$ on the $i^{th}$ antenna and the transmitting end 2 transmits the data $w_{2,j}s^*{}_1$ on the $j^{th}$ antenna, wherein, i=1, . . . , Tx1; j=1, . . . , Tx2.

Example 7

The example describes another embodiment of encoding by adopting the space diversity mode.

The number of transmitting physical antennas of the transmitting end 1 and the transmitting end 2 respectively are Tx1 and Tx2, and the antenna group of each transmitting end is mimicked as a beam, and each beam is a virtual antenna, the transmitted data stream is $s_1$, and the weight of the beamforming is:

$$W_1 = \begin{pmatrix} w_{1,1} \\ \vdots \\ w_{1,Tx1} \end{pmatrix}, W_2 = \begin{pmatrix} w_{2,1} \\ \vdots \\ w_{2,Tx2} \end{pmatrix}$$

When adopting the space diversity, the virtual antenna 1 and the virtual antenna 2 respectively transmit the data streams $s_1$ and $s^*{}_1$ at the same moment (or the subcarrier), that is, at the same moment (or the subcarrier), the situation of mapping to the physical antennas is shown in FIG. 10(*b*), in which the transmitting end 1 transmits the data $w_{1,i}s_1$ on the i-th antenna and the transmitting end 2 transmits the data $w_{2,j}s^*{}_1$ on the $j^{th}$ antenna, wherein, i=1, . . . , Tx1, j=1, . . . , Tx2.

Example 8

The example describes the embodiment of encoding by adopting the space multiplexing mode.

The number of transmitting physical antennas of the transmitting end 1 and the transmitting end 2 respectively are Tx1 and Tx2, and each transmitting end is mimicked as a beam, and each beam is a virtual antenna. The transmitted data streams are $s_1$ and $s_2$, and the weight of the beamforming is:

$$W_1 = \begin{pmatrix} w_{1,1} \\ \vdots \\ w_{1,Tx1} \end{pmatrix}, W_2 = \begin{pmatrix} w_{2,1} \\ \vdots \\ w_{2,Tx2} \end{pmatrix}$$

When adopting the space multiplexing, the virtual antenna 1 and the virtual antenna 2 respectively transmit the data streams $s_1$ and $s_2$ at the same moment (or the subcarrier), that is, at the same moment (or the subcarrier), the situation of mapping to the physical antennas is shown in FIG. 10(*a*), in which the transmitting end 1 transmits the data $w_{1,i}s_1$ on the $i^{th}$ antenna and the transmitting end 2 transmits the data $w_{2,j}s_2$ on the $j^{th}$ antenna, where, i=1, . . . , Tx1; j=1, . . . , Tx2.

Example 9

The example describes the embodiment of selecting the MIMO mode according to the receiving power and the distance in the case that two transmitting ends are mutual collaborative.

There are two base stations and an edge user in the system. The process of judging what MIMO mode the two stations use to transmit the data comprises:

(1) The base station 1 and the base station 2 measure respectively its uplink power $P_1$ and $P_2$ from the user.

(2) The distance $D=|P_1-P_2|^p$ from the user to the two base stations of power $P_1$ and $P_2$ is calculated, where p>0, and |•| represents an absolute value.

(3) D is compared to configured threshold values $d_1$ and $d_2$, where $0<d_1<d_2$.

3.1) If $D<d_1$, the space multiplexing mode of the collaborative MIMO beamforming is selected;

3.2) if $d_1 \leq D \leq d_2$, the space diversity mode of the collaborative MIMO beamforming is selected; and 3.3) if $D>d_2$, the single transmitting end MIMO mode is selected to transmit, and specifically, the step comprises:

3.3.1) if $P_1>P_2$, only the transmitting end 1 is used to transmit the data to the receiving end; and 3.3.2) if $P_1<P_2$, only the transmitting end 2 is used to transmit the data to the receiving end.

Example 10

The example describes the embodiment of selecting the MIMO mode by adopting the received signal to noise ratio and the distance in the case that two transmitting ends are mutual collaborative.

There are two base stations and an edge user in the system. The process of judging what MIMO mode the two stations use to transmit the data comprises:

(1) The base station 1 and the base station 2 measure respectively its uplink signal to noise ratio $CINR_1$ and $CINR_2$ from the user.

(2) The distance $D=|CINR_1-CINR_1|^p$ from the user to two base stations of signal to noise ratio $CINR_1$ and $CINR_2$ is calculated, where p>0, and |•| represents an absolute value.

(3) D is compared to configured threshold values $d_1$ and $d_2$, where $0<d_1<d_2$, 3.1) if $D<d_1$, the space multiplexing mode of the collaborative MIMO beamforming is selected;

3.2) if $d_1 \leq D \leq d_2$, the space diversity mode of the collaborative MIMO beamforming is selected; and 3.3) if $D>d_2$, the single transmitting end MIMO mode is selected to transmit, and specifically, the step comprises:

3.3.1) if $CINR_1>CINR_2$, only the base station 1 is used to transmit the data to the receiving end; and 3.3.2) if $CINR_1<CINR_2$, only the base station 2 is used to transmit the data to the receiving end.

Example 11

The example describes the embodiment of selecting the MIMO mode according to the received power and the ratio in the case that two transmitting ends are mutual collaborative.

There are two base stations and an edge user in the system. The process of judging what MIMO mode the two stations use to transmit the data comprises:

The base station 1 and the base station 2 measure respectively its uplink power $P_1$ and $P_2$ from the user.

(2) The ratio $$R = \min\left(\frac{CI_1}{CI_2}, \frac{CI_2}{CI_1}\right)$$

between $P_1$ and $P_2$, from the user to the two base stations respectively, is calculated, where min( ) represents selecting the smaller one from the two numbers.

(3) R is compared to configured threshold values $r_1$ and $r_2$, where $0<r_1<r_2$, 3.1) if $R>r_2$, the space multiplexing mode of the collaborative MIMO beamforming is selected;

3.2) if $r_1 \leq R \leq r_2$, the space diversity mode of the collaborative MIMO beamforming is selected; and 3.3) if $R<r_1$, the single transmitting end MIMO mode is selected to transmit, and specifically, the step comprises:

3.3.1) if $P_1>P_2$, only the base station 1 is used to transmit the data to the receiving end; and 3.3.2) if $P_1<P_2$, only the base station 2 is used to transmit the data to the receiving end.

Example 12

The example describes the embodiment of selecting the MIMO mode according to the received signal to noise ratio and the ratio in the case that two transmitting ends are mutual collaborative.

There are two base stations and an edge user in the system. The process of judging what MIMO mode the two stations use to transmit the data comprises:

(1) The base station 1 and the base station 2 measure respectively its uplink signal to noise ratio $CINR_1$ and $CINR_2$ from the user.

(2) The ratio $$R = \frac{\min(CI_1, CI_2)}{\max(CI_1, CI_2)}$$

between $CINR_1$ and $CINR_2$, from the user to the two base stations respectively, is calculated, wherein min( ) represents selecting the smaller one from two numbers, and max( ) represents selecting the bigger one from two numbers.

(3) R is compared to configured threshold values $r_1$ and $r_2$, where $0<r_1<r_2$, 3.1) if $R>r_2$, the space multiplexing mode of the collaborative MIMO beamforming is selected;

3.2) if $r_1 \leq R \leq r_2$, the space diversity mode of the collaborative MIMO beamforming is selected; and 3.3) if $R<r_1$, the single transmitting end MIMO mode is selected to transmit, and preferably, the step comprises:

3.3.1) if $CINR_1>CINR_2$, only the base station 1 is used to transmit the data to the receiving end; and 3.3.2) if $CINR_1<CINR_2$, only the base station 2 is used to transmit the data to the receiving end.

Example 13

The example describes the embodiment of acquiring the weight according to the fixed weight method in the case that two transmitting ends are mutual collaborative.

The transmitting ends preset a matrix (vector) set $W_i$, $i=1, 2, \ldots, N$, where $W_i$, $i=1, 2, \ldots$, and N is a plural vector.

The transmitting end 1 and the transmitting end 2 judge whether there is a need to update the weight, and if there is no need to update the weight, then the weight preconfigured by the system or the weight reserved in the last time is used. If there is a need to update the weight, then the weight is acquired by using the fixed weight method, and the process of acquiring the weight comprises:

(1) The statistical channel correlation matrixes $R_{stat,1}$, $R_{stat,2}$ of each transmitting end are initialized, symbol indexes used for the statistical channel correlation matrixes are selected, and a current symbol index is initialized.

(2) The channel correlation matrixes on a specific carrier set on the symbol corresponding to the current symbol index from the receiving end to each of the transmitting ends are calculated respectively:

$$R_1 = \sum_{k=1}^{N}(H_{Rx,Tx1}^1(k))^H * H_{Rx,Tx1}^1(k)$$

and $$R_2 = \sum_{k=1}^{N}(H_{Rx,Tx2}^2(k))^H * H_{Rx,Tx2}^2(k),$$

where $\alpha_{1,k}$ and $\alpha_{2,k}$ in $$R_i = \sum_{k=1}^{N} \alpha_{i,k}(H^i(k))^H * H^i(k)$$

are set as 1, the subscript of H represents the size of the matrix H, for example, the subscript Rx, Tx1 represents the matrix has Rx rows and Tx1 columns, N represents the number of carriers contained in the specific carrier set, and $H^1_{Rx,Tx1}(k)$, $H^2_{Rx,Tx2}(k)$ respectively are a channel coefficient matrix of the $k^{th}$ subcarrier in the specific carrier set which is from the transmitting antennas of the transmitting end 1 and the transmitting end 2 to the antennas of the receiving end.

(3) The statistical channel correlation matrixes of the two transmitting ends are updated respectively with $R_{stat,1}=\rho_1 R_{stat,1}+(1-\rho_1)R_1$ and $R_{stat,2}=\rho_2 R_{stat,2}+(1-\rho_2)R_2$, where $\rho_1$, $\rho_2$ are constants and $0\leq\rho_1, \rho_2\leq 1$, and the current symbol index is assumed to be the next index of the current symbol index in the symbol indexes used for the statistical channel correlation matrixes.

(4) Steps (2)-(3) are repeated until the current frame ends.

(5) The transmitting end 1 can acquire the corresponding weight $W_1$ based on the formula $$W_{opt} = \max_{W_i, j=1,\ldots,N} \det(W_i^H R_{stat,1} W_i),$$

and the transmitting end 2 can acquire the corresponding weight $W_2$ based on the formula $$W_{opt} = \max_{W_i, j=1,\ldots,N} \det(W_i^H R_{stat,2} W_i),$$

where, det( ) represents solving the determinant value of the matrix.

Example 14

The example describes the embodiment of acquiring the weight according to the eigenvector weight method in the case that two transmitting ends are mutual collaborative.

The transmitting end 1 and the transmitting end 2 judge whether there is a need to update the weight, and if there is no need to update the weight, the weight preconfigured by the system or the weight reserved in the last time is used. If there is a need to update the weight, then the weight is acquired by using the eigenvector weight method, and the process of acquiring the weight comprises:

(1) The statistical channel correlation matrixes $R_{stat,1}$, $R_{stat,2}$ of the each transmitting end are initialized, symbol indexes used for the statistical channel correlation matrixes are selected, and a current symbol index is initialized.

(2) The channel correlation matrixes on a specific carrier set on the symbol corresponding to the current symbol index from the receiving end to the each transmitting end are calculated respectively:

$$R_1 = \sum_{k=1}^{N}(H_{Rx,Tx1}^1(k))^H * H_{Rx,Tx1}^1(k)$$

and $$R_2 = \sum_{k=1}^{N}(H_{Rx,Tx2}^2(k))^H * H_{Rx,Tx2}^2(k),$$

where $\alpha_{1,k}$ and $\alpha_{2,k}$ in $$R_i = \sum_{k=1}^{N} \alpha_{i,k}(H^i(k))^H * H^i(k)$$

are set as 1, N represents the number of carriers contained in the specific carrier set, and $H^1_{Rx,Tx1}(k)$, $H^2_{Rx,Tx2}(k)$ respectively are a channel coefficient matrix of the $k^{th}$ subcarrier in the specific carrier set which is from the transmitting antennas of the transmitting end 1 and the transmitting end 2 to the antennas of the receiving end.

(3) The statistical channel correlation matrixes of the two transmitting ends are updated respectively as $R_{stat,1}=\rho_1 R_{stat,1}+(1-\rho_1)R_1$ and $R_{stat,2}=\rho_2 R_{stat,2}+(1-\rho_2)R_2$, where $\rho_1$, $\rho_2$ are constants and $0\leq\rho_1, \rho_2\leq 1$, and the current symbol index is assumed to be the next index of the current symbol index in the symbol indexes used for the statistical channel correlation matrixes.

(4) Steps (2)-(3) are repeated until the current frame ends.

(5) The transmitting end 1 performs the eigenvalue decomposition on the statistical channel correlation matrix $R_{stat,1}$ and uses the eigenvector $W_1$ corresponding to the maximum eigenvalue as the weight of the transmitting end 1, where $W_1$ is a Tx1×1 vector, and Tx1 is the number of transmitting antennas of the antenna sub-array 1.

(6) The transmitting end 2 performs the eigenvalue decomposition on the statistical channel correlation matrix $R_{stat,2}$ and uses the eigenvector $W_2$ corresponding to the maximum eigenvalue as the weight of the transmitting end 2, where $W_2$ is a Tx2×1 vector, and Tx2 is the number of transmitting antennas of the antenna sub-array 2.

Example 15

The example describes the embodiment of acquiring the weight according to the constant modulus eigenvector method in the case that two transmitting ends are mutual collaborative.

The transmitting end 1 and the transmitting end 2 judge whether there is a need to update the weight, and if there is no need to update the weight, the weight preconfigured by the system or the weight reserved in the last time is used. If there is a need to update the weight, then the weight is acquired by using the constant modulus eigenvector weight method, and its steps comprise:

(1) The statistical channel correlation matrixes $R_{stat,1}$, $R_{stat,2}$ of the each transmitting end are initialized, symbol indexes used for the statistical channel correlation matrixes are selected, and a current symbol index is initialized.

(2) The channel correlation matrixes on a specific carrier set on the symbol corresponding to the current symbol index from the receiving end to the each transmitting end are calculated respectively:

$$R_1 = \sum_{k=1}^{N} (H^1_{Rx,Tx1}(k))^H * H^1_{Rx,Tx1}(k)$$

and $$R_2 = \sum_{k=1}^{N} (H^2_{Rx,Tx2}(k))^H * H^2_{Rx,Tx2}(k),$$

where $\alpha_{1,k}$ and $\alpha_{2,k}$ in $$R_i = \sum_{k=1}^{N} \alpha_{i,k} (H^i(k))^H * H^i(k)$$

are set as 1, N represents the number of carriers contained in the specific carrier set, and $H^1_{Rx,Tx1}(k)$, $H^2_{Rx,Tx2}(k)$ respectively is a channel coefficient matrix of the $k^{th}$ subcarrier in the specific carrier set which is from the transmitting antennas of the transmitting end 1 and the transmitting end 2 to the antennas of the receiving end.

(3) The statistical channel correlation matrixes of the transmitting ends are updated respectively as $R_{stat,1} = \rho_1 R_{stat,1} + (1-\rho_1) R_1$ and $R_{stat,2} = \rho_2 R_{stat,2} + (1-\rho_2) R_2$, where $\rho_1$, $\rho_2$ are constants and $0 \leq \rho_1, \rho_2 \leq 1$, and the current symbol index is assumed to be the next index of the current symbol index in the symbol indexes used for the statistical channel correlation matrixes.

(4) Steps (2)-(3) are repeated until this frame ends.

(5) The transmitting end 1 performs the eigenvalue decomposition on the statistical channel correlation matrix $R_{stat,1}$ and uses the vector $W_1$ as the weight of the transmitting end 1 with the vector $W_1$ being obtained by performing the constant processing $W_1 = f(\tilde{W}_1)$ on the eigenvector $\tilde{W}_1$ corresponding to the maximum eigenvalue, where $W_1$, $\tilde{W}_1$ are Tx1×1 vectors, Tx1 is the number of transmitting antennas of the transmitting end 1, and f is a constant modulus operation which achieves the equal absolute values of individual elements in the vector operated.

(6) The transmitting end 2 performs the eigenvalue decomposition on the statistical channel correlation matrix $R_{stat,2}$ and uses the vector $W_2$ as the weight of the transmitting end 2 with the vector $W_2$ being obtained by performing the constant processing $W_2 = f(\tilde{W}_2)$ on the eigenvector corresponding to the maximum eigenvalue, where $W_2$, $\tilde{W}_2$ are Tx2×2 vectors, Tx2 is the number of transmitting antennas of the transmitting end 2, and f is a constant modulus operation which achieves the equal absolute values of individual elements in the vector operated.

Figure 7:
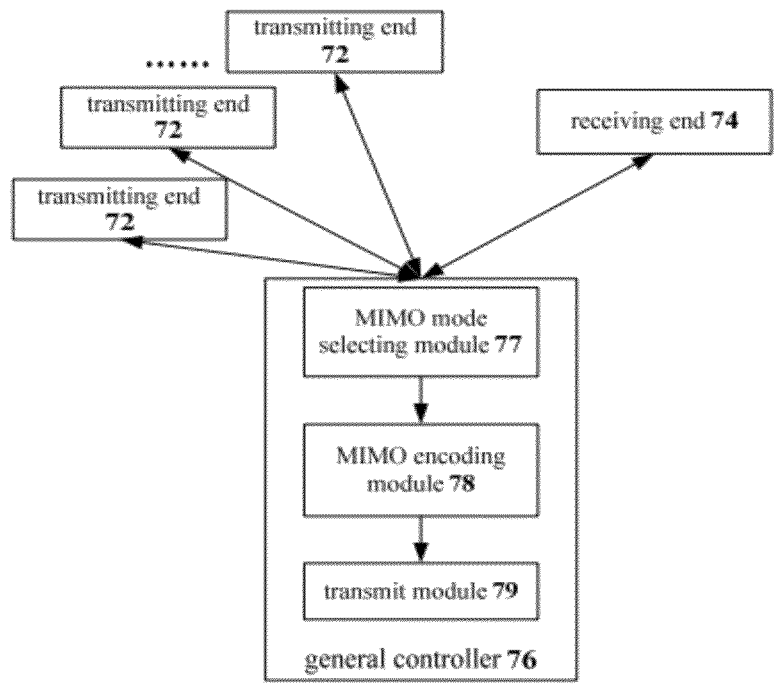
FIG. 7 is a structural block diagram of a system for transmitting data using the collaborative multiple input multiple output beamforming according to an embodiment of the present invention.
Figure 8:
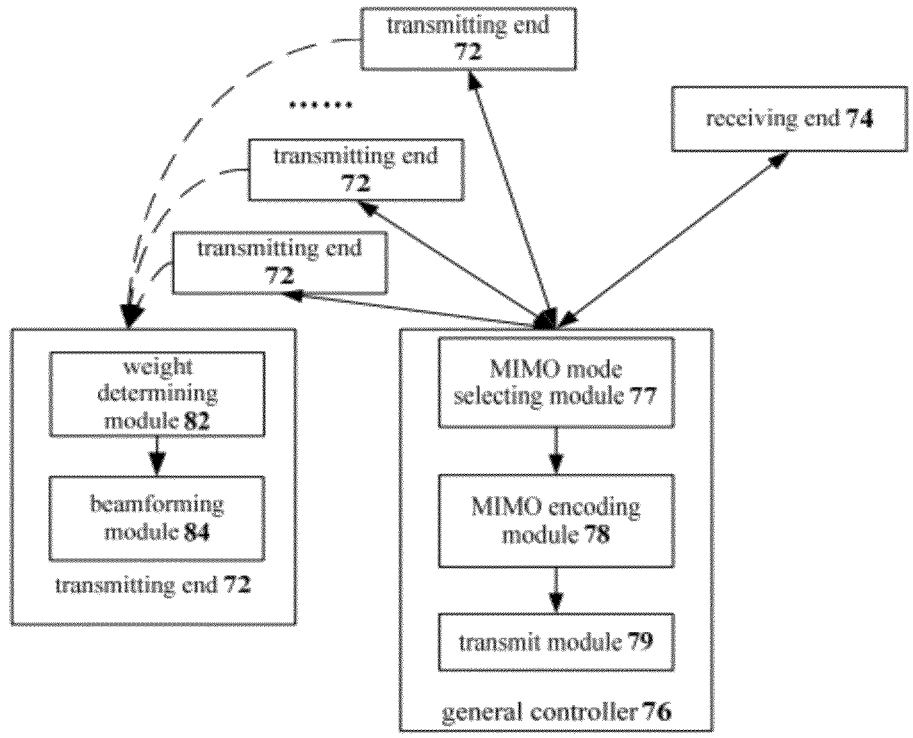
FIG. 8 is a detailed structural block diagram of a system for transmitting data using the collaborative multiple input multiple output beamforming according to an embodiment of the present invention.

The embodiment of the present invention provides a system for transmitting data using the collaborative MIMO beamforming, and as shown in FIG. 7, the system comprises a plurality of transmitting ends 72, a receiving end 74 and a general controller 76, wherein the general controller 76 comprises an MIMO mode selecting module 77, configured to select an MIMO mode according to CQI; an MIMO encoding module 78, configured to perform the MIMO encoding on a data stream according to the selected MIMO mode; and a transmit module 79, configured to distribute the encoded data stream to the plurality of transmitting ends 72 which are mutual collaborative; the plurality of transmitting ends 72 are configured to transmit the encoded data stream to the receiving end 74; and the receiving end 74 is configured to receive the encoded data stream.

Preferably, each of the plurality of transmitting ends 72 comprises: a weight determining module 82, configured to determine a weight of the beamforming; and a beamforming module 84, configured to weight the encoded data stream using the weight and transmit it to the receiving end.

Example 16

Figure 9:
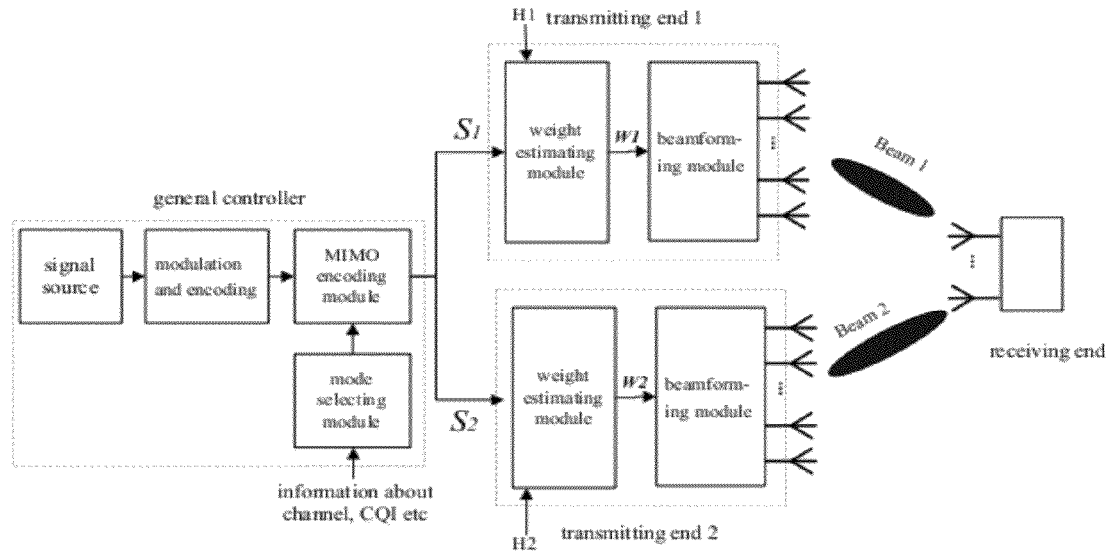
FIG. 9 is a structural schematic diagram of a system for transmitting data using the collaborative multiple input multiple output beamforming according to an embodiment of the present invention.

The example describes a detailed structure of a system for transmitting data using the collaborative MIMO beamforming according to the embodiment of the present invention, and as shown in FIG. 9, the system comprises:

a general controller, which comprises:

a MIMO mode selecting module, configured to select the space diversity mode of the collaborative MIMO beamforming or the space multiplexing mode of the collaborative MIMO beamforming or the single transmitting end MIMO mode, as the MIMO mode, according to the channel coefficient information.

a MIMO encoding module: configured to perform the MIMO encoding on the data stream which has been subjected to the channel modulation and encoding.

The plurality of transmitting ends, wherein each transmitting end comprises:

a weight determining module: configured to provide weight information to the MIMO beamforming, wherein the weight information can be the previously reserved weight information, and can also be the weight of the MIMO beamforming which is calculated by using the fixed weight method, the eigenvector method and the constant modulus eigenvector method, in which the statistical channel correlation matrix is calculated according to the channel information.

a beamforming module: configured to multiply the MIMO encoded data stream by the beamforming weight component on the corresponding transmitting end's antennas, and then transmit the weighted data through physical antennas of the corresponding transmitting end.

Example 17

The example describes a specific embodiment of the MIMO beamforming method adopting the mode selecting method and the weight acquiring method of the embodiment of the present invention in the case that two transmitting ends are mutual collaborative, in conjunction with the system for transmitting the data using the collaborative MIMO beamforming in the example 16.

Both of the two collaborative transmitting ends are the base stations, and they have Tx antennas respectively, with these antennas being omnidirectional antennas arranged in a linear array, and there is a general controller between the collaborative base stations which controls the system scheduling, the data distribution and the MIMO mode selection. The base stations preset a matrix (vector) set $W_i$, i=1, 2, . . . , N, where $W_i$, i=1, 2, . . . , N is a Tx×1-dimensional plural matrix, and where Tx is the number of the transmitting antennas.

There are M users under the two collaborative base stations, and each user has two antennas. The two collaborative base stations carry out the following operations for each user, so as to implement the collaborative MIMO beamforming.

The general controller performs the channel modulation and encoding on the data stream, and inputs the data stream, which has been subjected to the channel modulation and encoding, to the MIMO encoding module. Moreover, the MIMO mode selecting module is used to carry out the following operations, so as to acquire the currently used MIMO mode.

(1) The base station 1 and the base station 2 measure respectively its uplink power $P_1$ and $P_2$ from the user.

(2) The distance $D=|P_1-P_2|^p$ from the user to two base stations of power $P_1$ and $P_2$ is calculated, where p>0, and |•| represents the absolute value.

(3) D is compared to configured threshold values $d_1$ and $d_2$, where $0<d_1<d_2$, and if the result is $d_1 \leq D \leq d_2$, the space diversity mode of the collaborative MIMO beamforming is selected.

The MIMO encoding module divides the data streams into groups each having two streams, marked as $s_{i,1}$, $s_{i,2}$, and carries out the space diversity encoding $$\begin{pmatrix} s_{i,2} & -s_{1,2}^* \\ s_{i,2} & s_{i,1}^* \end{pmatrix}$$

thereto, where i=1, . . . , $N_s/2$, and $N_s$ is the length of the data stream.

The weights $W_1$ and $W_2$ of the two base stations are calculated in the weight estimating module, where both $W_1$ and $W_2$ are Tx×1 vectors. The weight estimating module judges whether there is a need to update the weight, and if there is no need to update the weight, then the weight preconfigured by the system or the weight reserved in the last time is used. If there is a need to update the weight, then the weight is acquired by using the fixed weight method, comprising the steps:

(1) The statistical channel correlation matrixes $R_{stat,1}$, $R_{stat,2}$ of the each transmitting end are initialized, symbol indexes used for the statistical channel correlation matrixes are selected, and a current symbol index is initialized.

(2) The channel correlation matrixes on a specific carrier set on the symbol corresponding to the current symbol index from the receiving end to the each transmitting end are calculated respectively:

$$R_1 = \sum_{k=1}^{N} (H^1_{Rx,Tx1}(k))^H * H^1_{Rx,Tx1}(k)$$

and $$R_2 = \sum_{k=1}^{N} (H^2_{Rx,Tx2}(k))^H * H^2_{Rx,Tx2}(k),$$

where $\alpha_{1,k}$ and $\alpha_{2,k}$ in $$R_i = \sum_{k=1}^{N} \alpha_{i,k} (H^i(k))^H * H^i(k)$$

are set as 1, N represents the number of carriers contained in the specific carrier set, and $H^1_{Rx,Tx1}(k)$, $H^2_{Rx,Tx2}(k)$ respectively are a channel coefficient matrix of the $k^{th}$ subcarrier in the specific carrier set which is from the transmitting antennas of the transmitting end 1 and the transmitting end 2 to the antennas of the receiving end.

(3) The statistical channel correlation matrixes of the two transmitting ends are updated respectively as $R_{stat,1}=\rho_1 R_{stat,1}+(1-\rho_1)R_1$ and $R_{stat,2}=\rho_2 R_{stat,2}+(1-\rho_2)R_2$, where $\rho_1$, $\rho_2$ are constants and $0 \leq \rho_1, \rho_2 \leq 1$, and the current symbol index is assumed to be the next index of the current symbol index in the symbol indexes used for the statistical channel correlation matrixes.

(4) Steps (2)-(3) are repeated until this frame ends.

(5) The transmitting end 1 can acquire the corresponding weight $W_1$ based on the formula $$W_{opt} = \max_{W_i, i=1,\ldots,N} \det(W_i^H R_{stat,1} W_i),$$

and the transmitting end 2 can acquire the corresponding weight $W_2$ based on the formula $$W_{opt} = \max_{W_i, i=1,\ldots,N} \det(W_i^H R_{stat,2} W_i),$$

where, det( ) represents solving the determinant value of the matrix.

After having obtained the weight, the weight is used to weight the data stream, and after having weighted, the data $w_{1,j} s_{i,1}$ and $w_{2,j} s_{i,2}$ are transmitted respectively on the $j^{th}$ antennas of the base station 1 and the base station 2 at the first symbol time of the time pairs. At the second symbol time, the data $-w_{1,j}s^*_{i,2}$ and $w_{2,j}s^*_{i,2}$ are transmitted respectively on the $j^{th}$ antennas of the base station 1 and the base station 2, where $j=1, \ldots, Tx$, $i=1, \ldots, N_s/2$, $W_1=(W_{1,1}, \ldots, W_{1,Tx1})^T$, $W_2=(W_{2,1}, \ldots, W_{2,Tx2})^T$.

Example 18

The example describes a specific embodiment of the MIMO beamforming method adopting the mode selecting method and the weight acquiring method of the embodiment of the present invention in the case that two transmitting ends are mutual collaborative, in conjunction with the system for transmitting the data using the collaborative MIMO beamforming in the example 16.

Both of the two collaborative transmitting ends are base stations, and they have Tx antennas respectively, with these antenna being dual-polarized antennas arranged in a linear array, and there is a general controller between the collaborative base stations which controls the system scheduling, the data distribution and the MIMO mode selection. There are M users under the two collaborative base stations, and each user has two antennas. The two collaborative base stations carry out the following operations for each user, so as to implement the collaborative MIMO beamforming.

The general controller performs the channel modulation and encoding on the data stream, and inputs the data stream, which has been subjected to the channel modulation and encoding, to the MIMO encoding module. Moreover, the MIMO mode selecting module is used to carry out the following operations, so as to acquire the currently used MIMO mode.

(1) The base station 1 and the base station 2 measure respectively its uplink signal to noise ratio $CINR_1$ and $CINR_2$ from the user.

(2) The ratio $$R = \min\left(\frac{CINR_1}{CINR_2}, \frac{CINR_2}{CINR_1}\right)$$

between $CINR_1$ and $CINR_2$, from the user to the two base station respectively, is calculated, wherein min( ) represents taking the smaller one in two numbers.

(3) R is compared to configured threshold values $r_1$ and $r_2$, where $0<r_1<r_2$, and if the result is $R>r_2$, the space multiplexing mode of the collaborative MIMO beamforming is used.

The MIMO encoding module divides the input data streams into groups each having two streams, marked as $s_{i,1}$, $s_{i,2}$, and carries out the space diversity encoding $$\begin{pmatrix} s_{i,1} \\ s_{i,2} \end{pmatrix}$$

thereto, where $i=1, \ldots, N_s/2$, and $N_s$ is the length of the data stream.

The weights $W_1$ and $W_2$ of the two base stations are calculated in the weight estimating module, where both $W_1$ and $W_2$ are Tx×1 vectors. The weight estimating module judges whether there is a need to update the weight, and if there is no need to update the weight, then the weight preconfigured by the system or the weight reserved in the last time is used. If there is a need to update the weight, then the weight is acquired by using the fixed weight method, comprising steps:

(1) The statistical channel correlation matrixes $R_{stat,1}$, $R_{stat,2}$ of the each transmitting end are initialized, symbol indexes used for the statistical channel correlation matrixes are selected, and a current symbol index is initialized.

(2) The channel correlation matrixes on a specific carrier set on the symbol corresponding to the current symbol index from the receiving end to the each transmitting end are calculated respectively:

$$R_1 \sum_{k=1}^{N} (H^1_{Rx,Tx1}(k))^H * H^1_{Rx,Tx1}(k)$$

and $$R_2 = \sum_{k=1}^{N} (H^2_{Rx,Tx2}(k))^H * H^2_{Rx,Tx2}(k),$$

where $\alpha_{1,k}$ and $\alpha_{2,k}$ in $$R_i = \sum_{k=1}^{N} \alpha_{i,k}(H^i(k))^H * H^i(k)$$

are set as 1, N represents the number of carriers contained in the specific carrier set, and $H^1_{Rx,Tx1}(k)$, $H^2_{Rx,Tx2}(k)$ respectively are a channel coefficient matrix of the $k^{th}$ subcarrier in the specific carrier set which is from the transmitting antennas of the transmitting end 1 and the transmitting end 2 to the antennas of the receiving end.

(3) The statistical channel correlation matrixes of the two transmitting ends are updated respectively as $R_{stat,1}=\rho_1 R_{stat,1}+(1-\rho_1)R_1$ and $R_{stat,2}=\rho_2 R_{stat,2}+(1-\rho_2)R_2$, where $\rho_1$, $\rho_2$ are constants and $0 \leq \rho_1, \rho_2 \leq 1$, and the current symbol index is assumed to be the next index of the current symbol index in the symbol indexes used for the statistical channel correlation matrixes.

(4) Steps (2)-(3) are repeated until this frame ends.

(5) The transmitting end 1 performs the eigenvalue decomposition on the statistical channel correlation matrix $R_{stat,1}$ and uses the eigenvector $W_1$ corresponding to the maximum eigenvalue as the weight of the transmitting end 1, where $W_1$ is a Tx1×1 vector, and Tx1 is the number of transmitting antennas of the antenna sub-array 1.

(6) The transmitting end 2 performs the eigenvalue decomposition on the statistical channel correlation matrix $R_{stat,2}$ and uses the eigenvector $W_2$ corresponding to the maximum eigenvalue as the weight of the transmitting end 2, where $W_2$ is a Tx2×1 vector, and Tx2 is the number of transmitting antennas of the antenna sub-array 2.

After having obtained the weight, the weight is used to weight the data stream, and after having weighted, the data $W_{1,j}s_{i,1}$ and $W_{2,j}s_{i,2}$ are transmitted respectively on the $j^{th}$ antennas of the base station 1 and the base station 2 at the same first symbol time, where $j=1, \ldots, Tx$; $i=1, \ldots, N_s/2$; $W_1=(W_{1,1}, \ldots, W_{1,Tx1})^T$, $W_2=(W_{2,1}, \ldots, W_{2,Tx2})^T$.

Example 19

The example describes a general embodiment of the MIMO beamforming method adopting the mode selecting method and the weight acquiring method of the embodiment of the present invention, in conjunction with the system for transmitting the data using the collaborative MIMO beamforming in the example 16.

Both of the two collaborative transmitting ends are base stations, which have Tx antennas respectively, and the antennas are the linear array antennas, or the dual-polarized antennas, or the cylindrical antennas. There is a general controller between the collaborative base stations which controls the system scheduling, the data distribution and the MIMO mode selection. The base stations preset a vector set W, i=1, 2, . . . , N, where $W_i$, i=1, 2, . . . , N is a Tx×1-dimensional plural vector, and Tx is the number of the transmitting antennas.

There are M users under the two collaborative base stations, and each user has two antennas. The two collaborative base stations carry out the following operations for each user, so as to implement the collaborative MIMO beamforming.

The general controller inputs the data stream, which has been subjected to the channel modulation and encoding by the controller, to the MIMO encoding module, and the MIMO encoding module carries out the corresponding MIMO encoding according to the MIMO mode (i.e. the space diversity encoding of the collaborative MIMO beamforming, or the space multiplexing encoding of the collaborative MIMO beamforming, or the single base station MIMO encoding) obtained by the MIMO mode selecting module. The MIMO encoded data stream is $X_i=(x_{i,1}, x_{i,2})^T$, where i=1, 2, . . . , $N_s/S$, and $N_s$ is the total length of the data stream.

The MIMO encoded data stream is distributed to the corresponding base station, and the base station 1 and the base station 2 perform the weigh processing on the input data stream according to the weight obtained by the weight estimating module, and transmit the weight processed data stream through the corresponding physical antennas.

The wireless communication system sends the data stream into the MIMO encoding module, and the MIMO encoding module carries out the corresponding MIMO encoding according to the current MIMO mode and then distributes the MIMO encoded data stream to the plurality of mutual collaborative transmitting ends, and each transmitting end weights the data stream by using a group of weight coefficients and at last transmits the weighted data stream through the corresponding physical antennas.

In this case, the current MIMO mode is provided by the MIMO mode selecting module, and the weight is acquired by the process of the weight estimating module.

In summary, the methods and the systems for transmitting data using the collaborative multiple input multiple output (MIMO) beamforming provided by the embodiments of the present invention can improve the system performance, improve the coverage to the maximum extent, reduce the interference between the cells and improve the communication quality of the cell edge users.

It needs to be noted that steps shown in the flowchart of the accompanying drawings can be executed in, for example, a computer system with a group of computer executable instructions, moreover, although the logical order is shown in the flowchart, in some cases, the steps shown or described can be carried out in a different order.

Above description is only to illustrate the preferred embodiments but not to limit the present invention. Various alterations and changes to the present invention are apparent to those skilled in the art. The scope defined in claims shall cover any modification, equivalent substitution and improvement within the spirit and principle of the present invention.

What is claimed is:

1. A method for transmitting data using the collaborative multiple input multiple output (MIMO) beamforming, the method comprising:

selecting an MIMO mode in accordance with channel quality information (CQI), wherein selecting the MIMO mode in accordance with the CQI comprises:
selecting one MIMO mode from a plurality of predetermined MIMO modes in accordance with the CQI, wherein the plurality of predetermined MIMO modes comprise: a space multiplexing mode of the collaborative MIMO beamforming, a space diversity mode of the collaborative MIMO beamforming and a single transmitting end MIMO mode, wherein selecting the one MIMO mode from the plurality of predetermined MIMO modes in accordance with the CQI comprises at least one of the following:
(i) calculating $D=f(CI_1, \ldots, CI_i, \ldots, CI_N)$, where a is the CQI from a receiving end to the $i^{th}$ transmitting end, i=1, . . . , N, where N is the number of the plurality of transmitting ends, and $f(CI_1, \ldots, CI_i, \ldots, CI_N)$ is the quantization operation for the proximity of values $CI_1, \ldots, CI_i, \ldots, CI_N$;
judging whether D is less than a first threshold value $d_1$,
if $D<d_1$, then selecting the space multiplexing mode of the collaborative MIMO beamforming from the plurality of predetermined MIMO modes;
if $D\geq d_1$, judging whether D is less than a second threshold value $d_2$,
if $D<d_2$, selecting the space diversity mode of the collaborative MIMO beamforming from the plurality of predetermined MIMO modes; and
if $D\geq d_2$, selecting the single transmitting end MIMO mode from the plurality of predetermined MIMO modes,
wherein $0<d_1<d_2$; or
(ii) calculating $R=f(CI_1, \ldots, CI_i, \ldots, CI_N)$, wherein a is the CQI from a receiving end to the $i^{th}$ transmitting end, i=1, . . . N, N is the number of the plurality of transmitting ends, and $f(CI_1, \ldots, CI_i, \ldots, CI_N)$ is the quantization operation for the ratio of values $CI_1, \ldots, CI_i, \ldots, CI_N$;
judging whether R is greater than a second threshold value $r_2$,
if $R>r_2$, and selecting the space multiplexing mode of the collaborative MIMO beamforming from the plurality of predetermined MIMO modes;
if $R\leq r_2$, judging whether R is greater than or equal to a preconfigured first threshold value $r_1$,
if $R\geq r_1$, selecting the space diversity mode of the collaborative MIMO beamforming from the plurality of predetermined MIMO modes; and
if $R<r_1$, selecting the single transmitting end MIMO mode from the plurality of predetermined MIMO modes,
where $0<r_1<r_2$;
performing MIMO encoding on a data stream in accordance with the selected MIMO mode, and distributing the encoded data stream to a plurality of transmitting ends which are mutual collaborative, wherein each of the plurality of transmitting ends comprises a plurality of transmitting antennas; and
transmitting, by the plurality of transmitting ends, the encoded data stream.

2. The method according to claim 1, wherein in the case of Way One, $f(CI_1, \ldots, CI_i, \ldots, CI_N)=\Sigma_{1\leq k<j\leq N}|CI_k-CI_j|^p$, where p>0, k and j are the positive integers; and in the case of Way Two, $$f(CI_1, \ldots, CI_i, \ldots, CI_N) = \frac{\min(CI_1, \ldots, CI_i, \ldots, CI_N)}{\max(CI_1, \ldots, CI_i, \ldots, CI_N)},$$

$$f(CI_1, \ldots, CI_i, \ldots, CI_N) = \sum_{1 \le k < j \le N} \beta_{kj} \min\left(\frac{CI_k}{CI_j}, \frac{CI_j}{CI_k}\right)$$

or $$f(CI_1, \ldots, CI_i, \ldots, CI_N) = \sum_{1 \le k < j \le N} \beta_{kj} \min\left(\frac{CI_k}{CI_j}, \frac{CI_j}{CI_k}\right),$$

where $\min(X_1, X_2, \ldots)$ represents calculating the minimum value in $X_1, X_2, \ldots$, $\max(X_1, X_2, \ldots)$ represents calculating the maximum value in $X_1, X_2, \ldots$, and $\beta_{kj}$ is a constant.

3. The method according to claim 2, wherein $CI_1, \ldots, CI_i, \ldots, CI_N$ comprise at least one of the following: a received power, and a predetermined signal to noise ratio, wherein the predetermined signal to noise ratio comprises at least one of the following: a signal to noise ratio (SNR), a signal to interference and noise ratio (SINR) and a carrier to interference plus noise ratio (CINR).

4. The method according to claim 1, wherein the step of selecting the single transmitting end MIMO mode from the plurality of predetermined MIMO modes comprises:
    selecting the single transmitting end MIMO mode in which the transmitting end corresponding to the maximum value in $CI_1, \ldots, CI_i, \ldots, CI_N$ sends the data to the receiving end.

5. The method according to claim 4, wherein $CI_1, \ldots, CI_i, \ldots, CI_N$ comprise at least one of the following: a received power, and a predetermined signal to noise ratio, wherein the predetermined signal to noise ratio comprises at least one of the following: a signal to noise ratio (SNR), a signal to interference and noise ratio (SINR) and a carrier to interference plus noise ratio (CINR).

6. The method according to claim 1, $CI_1, \ldots, CI_i, \ldots, CI_N$ comprise at least one of the following: a received power, and a predetermined signal to noise ratio, wherein the predetermined signal to noise ratio comprises at least one of the following: a signal to noise ratio (SNR), a signal to interference and noise ratio (SINR) and a carrier to interference plus noise ratio (CINR).

7. The method according to claim 1, wherein the step of transmitting by the plurality of transmitting ends the encoded data stream comprises:
    determining a beamforming weight of each transmitting end in the plurality of transmitting ends; and
    weighting, by the each transmitting end, using the weight, the encoded data stream and transmitting the weighted data stream.

8. The method according to claim 7, wherein, before the determining the beamforming weight of the each transmitting end in the plurality of transmitting ends, the method further comprises:
    judging whether there is a need to update the weight, if yes, then continuing the subsequent processing, otherwise, weighting, by the each transmitting end, the MIMO encoded data stream transmitted, using the weight preconfigured by the system or the weight determined in the last time, and transmitting it.

9. The method according to claim 7, wherein the step of determining the beamforming weight of the each transmitting end in the plurality of transmitting ends comprises:
    acquiring a statistical channel correlation matrix of the each transmitting end in accordance with channel coefficient information; and
    determining the beamforming weight of the each transmitting end in accordance with the statistical channel correlation matrix.

10. The method according to claim 9, wherein the step of determining the beamforming weight of the each transmitting end in accordance with the statistical channel correlation matrix comprises one of the following ways of:
    Way 1: setting $$W_{opt} = \max_{W_j, j=1, \ldots, N} \det(W_j^H R_{stat,i} W_j)$$

wherein $W_{opt}$ refers to a beamforming weight of the $i^{th}$ transmitting end, $W_j$, $j=1, 2, \ldots, N$ is a preset plural column vector, and $\det(x)$ represents calculating the determinant value of matrix x;

Way 2: performing the eigenvalue decomposition on the statistical channel correlation matrix $R_{stat,i}$, and setting the eigenvector $W_i$ corresponding to the maximum eigenvalue as the beamforming weight of the $i^{th}$ transmitting end, wherein $W_i$ is a Txi×1 vector, and Txi is the number of transmitting antennas of the $i^{th}$ transmitting end; and Way 3: performing the eigenvalue decomposition on the statistical channel correlation matrix $R_{stat,i}$, and setting $W_i = f(\tilde{W}_i)$ as the beamforming weight of the $i^{th}$ transmitting end, wherein $\tilde{W}_i$ is a eigenvector corresponding to the maximum eigenvalue obtained by the eigenvalue decomposition for $R_{stat,i}$, where $W_i$ and $\tilde{W}_i$ are Txi×1 vectors, and Txi is the number of transmitting antennas of the $i^{th}$ transmitting end, and $f(\tilde{W}_i)$ represents performing a constant modulus operation on the vector $\tilde{W}_i$.

11. The method according to claim 9, wherein the step of acquiring the statistical channel correlation matrix of the each transmitting end in accordance with channel coefficient information comprises:
    an initialization step: initializing the statistical channel correlation matrix of the each transmitting end, selecting symbol indexes used for the statistical channel correlation matrixes in a current frame, and letting a current symbol index be the first index in the symbol indexes used for the statistical channel correlation matrixes, wherein the statistical channel correlation matrix of the $i^{th}$ transmitting end is $R_{stat,i}$, where i is a positive integer;
    a calculation step: calculating the channel correlation matrix $$R_i = \sum_{k=1}^{N} \alpha_{i,k} (H^i(k))^H * H^i(k)$$

on a predetermined carrier set on the symbol corresponding to the current symbol index from the receiving end to the $i^{th}$ transmitting end, where N is the number of carriers contained in the predetermined carrier set, $H^i(k)$ is a channel coefficient matrix of the $k^{th}$ subcarrier in the predetermined carrier set which is from a transmitting antenna of the $i^{th}$ transmitting end to an antenna of the receiving end, the superscript H represents a conjugate transposition operation for the matrix $H^i(k)$, and $\alpha_{i,k}$ is a proportional coefficient occupied by $H^i(k)$;

an update step: updating the statistical channel correlation matrix of the $i^{th}$ transmitting end $R_{stat,i}=\rho_i R_{stat,i}+(1-\rho_i)R_i$, and updating the value of the current symbol index with the next symbol index of the current symbol index, where $\rho_i$ is a constant and $0\leq\rho_i\leq1$; and a control step: repeating the calculation step and the update step until the symbol corresponding to the current symbol index being the last index in the symbol indexes used for the statistical channel correlation matrixes.

12. The method according to claim 11, wherein $H^i(k)$ is acquired by at least one of the following ways of:

Way 1: measuring, by the $i^{th}$ transmitting end, a channel coefficient matrix of an uplink channel corresponding to the receiving end, and acquiring the $H^i(k)$ which has Rx rows and Txi columns in accordance with the measured channel coefficient matrix, wherein Rx is the number of receiving antennas of the receiving end, and Txi is the number of transmitting antennas of the $i^{th}$ transmitting end; and Way 2: feeding back, by the receiving end, the channel coefficient matrix corresponding to the receiving end to the $i^{th}$ transmitting end through an uplink feedback channel, and acquiring the $H^i(k)$ which has Rx rows and Txi columns in accordance with the fed back channel coefficient matrix, wherein Rx is the number of receiving antennas of the receiving end, and Txi is the number of transmitting antennas of the $i^{th}$ transmitting end.

13. The method according to claim 12, wherein the uplink channel comprises one of the following: a data channel for the receiving end transmitting the uplink service, the uplink feedback channel for the receiving end feeding back information to the $i^{th}$ transmitting end, and a channel corresponding to a Sounding signal or a pilot signal sent by the receiving end to the $i^{th}$ transmitting end.

14. A system for transmitting data using collaborative multiple input multiple output (MIMO) beamforming, the system comprising a plurality of transmitting ends, a receiving end and a general controller, wherein the general controller comprises:

an MIMO mode selecting module, connected to an MIMO encoding module and configured to selecting an MIMO mode in accordance with channel quality information (CQI), wherein the MIMO mode selecting module is further configured to select one MIMO mode from a plurality of predetermined MIMO modes in accordance with the CQI, wherein the plurality of predetermined MIMO modes comprise: a space multiplexing mode of the collaborative MIMO beamforming, a space diversity mode of the collaborative MIMO beamforming and a single transmitting end MIMO mode, wherein the MIMO mode selecting module is further configured to select the one MIMO mode from the plurality of predetermined MIMO modes in accordance with the CQI in one of the following ways of:

Way One: calculating $D=f(CI_1, \ldots, CI_i, \ldots, CI_N)$, where $CI_i$ is the CQI from a receiving end to the $i^{th}$ transmitting end, $i=1,\ldots,N$, where N is the number of the plurality of transmitting ends, and $f(CI_1, \ldots, CI_i, \ldots, CI_N)$ is the quantization operation for the proximity of values $CI_1, \ldots, CI_i, \ldots, CI_N$;

judging whether D is less than a first threshold value $d_1$, if $D<d_1$, then selecting the space multiplexing mode of the collaborative MIMO beamforming from the plurality of predetermined MIMO modes;

if $D\geq d_1$, judging whether D is less than a second threshold value $d_2$, if $D<d_2$, selecting the space diversity mode of the collaborative MIMO beamforming from the plurality of predetermined MIMO modes; and if $D\geq d_2$, selecting the single transmitting end MIMO mode from the plurality of predetermined MIMO modes, wherein $0<d_1<d_2$; and Way Two: calculating $R=f(CI_1, \ldots, CI_i, \ldots, CI_N)$, wherein $CI_i$ is the CQI from a receiving end to the $i^{th}$ transmitting end, $i=1,\ldots N$, N is the number of the plurality of transmitting ends, and $f(CI_1, \ldots, CI_i, \ldots, CI_N)$ is the quantization operation for the ratio of values $CI_1, \ldots, CI_i, \ldots, CI_N$;

judging whether R is greater than a second threshold value $r_2$, if $R>r_2$, and selecting the space multiplexing mode of the collaborative MIMO beamforming from the plurality of predetermined MIMO modes;

if $R\leq r_2$, judging whether R is greater than or equal to a preconfigured first threshold value $r_1$, if $R\geq r_1$, selecting the space diversity mode of the collaborative MIMO beamforming from the plurality of predetermined MIMO modes; and if $R<r_1$, selecting the single transmitting end MIMO mode from the plurality of predetermined MIMO modes, where $0<r_1<r_2$;

the MIMO encoding module, connected to the MIMO mode selecting module and a transmit module, and configured to perform MIMO encoding on a data stream in accordance with the selected MIMO mode; and the transmit module, connected to the MIMO encoding module and configured to distribute the encoded data stream to the plurality of transmitting ends which are mutual collaborative, the plurality of transmitting ends are configured to transmit the encoded data stream to the receiving end, wherein each of the plurality of transmitting ends comprises a plurality of transmitting antennas; and the receiving end is configured to receive the encoded data stream.

15. The system according to claim 14, wherein each of the plurality of transmitting ends comprises:

a weight determining module, connected to a beamforming module and configured to determine a beamforming weight; and the beamforming module, connected to the weight determining module and configured to weight the encoded data stream by using the beamforming weight and transmit the encoded data stream to the receiving end.

16. A general controller for transmitting data using collaborative multiple input multiple output (MIMO) beamforming, comprising:

an MIMO mode selecting module, connected to an MIMO encoding module and configured to select an MIMO mode in accordance with channel quality information (CQI), wherein the MIMO mode selecting module is further configured to select one MIMO mode from a plurality of predetermined MIMO modes in accordance with the CQI, wherein the plurality of predetermined MIMO modes comprise: a space multiplexing mode of the collaborative MIMO beamforming, a space diversity mode of the collaborative MIMO beamforming and a single transmitting end MIMO mode, wherein the MIMO mode selecting module is further configured to select the one MIMO mode from the plurality of predetermined MIMO modes in accordance with the CQI in one of the following ways of:

Way One: calculating $D=f(CI_1, \ldots, CI_i, \ldots, CI_N)$, where $CI_i$ is the CQI from a receiving end to the $i^{th}$ transmitting end, $i=1, \ldots, N$, where N is the number of the plurality of transmitting ends, and $f(CI_1, \ldots, CI_i, \ldots, CI_N)$ is the quantization operation for the proximity of values $CI_1, \ldots, CI_i, \ldots, CI_N$;

judging whether D is less than a first threshold value $d_1$, if $D<d_1$, then selecting the space multiplexing mode of the collaborative MIMO beamforming from the plurality of predetermined MIMO modes;

if $D \geq d_1$, judging whether D is less than a second threshold value $d_2$, if $D<d_2$, selecting the space diversity mode of the collaborative MIMO beamforming from the plurality of predetermined MIMO modes; and if $D \geq d_2$, selecting the single transmitting end MIMO mode from the plurality of predetermined MIMO modes, wherein $0<d_1<d_2$; and Way Two: calculating $R=f(CI_1, \ldots, CI_i, \ldots, CI_N)$, wherein $CI_i$ is the CQI from a receiving end to the $i^{th}$ transmitting end, $i=1, \ldots, N$, N is the number of the plurality of transmitting ends, and $f(CI_1, \ldots, CI_i, \ldots, CI_N)$ is the quantization operation for the ratio of values $CI_1, \ldots, CI_i, \ldots, CI_N$;

judging whether R is greater than a second threshold value $r_2$, if $R>r_2$, and selecting the space multiplexing mode of the collaborative MIMO beamforming from the plurality of predetermined MIMO modes;

if $R \leq r_2$, judging whether R is greater than or equal to a preconfigured first threshold value $r_1$, if $R \geq r_1$, selecting the space diversity mode of the collaborative MIMO beamforming from the plurality of predetermined MIMO modes; and if $R<r_1$, selecting the single transmitting end MIMO mode from the plurality of predetermined MIMO modes, where $0<r_1<r_2$;

the MIMO encoding module, connected to the MIMO mode selecting module and a transmit module, and configured to perform MIMO encoding on a data stream in accordance with the selected MIMO mode; and the transmit module, connected to the MIMO encoding module and configured to distribute the encoded data stream to a plurality of transmitting ends which are mutual collaborative, wherein each of the plurality of transmitting ends comprises a plurality of transmitting antennas.

* * * * *